United States Patent Office 3,461,127
Patented Aug. 12, 1969

3,461,127
PREPARATION OF PYRIDINES
John Edward Colchester, Runcorn, England, assignor to Imperial Chemical Industries Limited, London, England, a corporation of Great Britain
No Drawing. Filed Sept. 3, 1965, Ser. No. 485,082
Claims priority, application Great Britain, Sept. 10, 1964, 37,117/64
Int. Cl. C07d 31/08
U.S. Cl. 260—290          8 Claims

ABSTRACT OF THE DISCLOSURE

There is provided a process for the manufacture of pyridine or substituted pyridines by interacting a glutaraldehyde or a precursor thereof in the liquid phase with an ammonium salt in the presence of a quinone.

---

This invention relates to the manufacture of organic bases, and in particular to a process for the manufacture of pyridine or substituted pyridines.

According to the present invention there is provided a process for the manufacture of pyridine or substituted pyridines which comprises interacting glutaraldehyde, a substituted glutaraldehyde or a precursor thereof in the liquid phase with ammonium ions or ammonia in the presence of a quinone containing a 1,2-benzoquinone ring or a 1,4-benzoquinone ring, the quinone ring being substituted by one or more halogen atoms and/or being fused to one or more benzene rings.

By the term "precursor" is denoted a compound which, in the absence of ammonium ions, will give rise to glutaraldehyde or a substituted glutaraldehyde when subjected to the conditions of temperature and pH contemplated for use in the reaction. Such precursors may be, for example, the cyclic enol-acetals of the said aldehydes. The cyclic enol-acetals are alternatively described as ethers of 2-hydroxy-3,4-dihydro-2H-pyrans. In particular, the alkyl ethers (2-alkoxy-3,4-dihydro-2H-pyrans) may be used, for example the compounds containing up to 6 carbon atoms in the alkoxy group.

Suitable quinones include naphthoquinones and compounds wherein a benzoquinone ring is substituted by one or more chlorine atoms. Especially preferred quinones are 2,3,5,6-tetrachloro-1,4-benzoquinone (chloranil) and 1,4-naphthoquinone.

It is preferred to carry out the reaction under conditions such that the ammonia is present predominantly as ammonium ions rather than as free ammonia; the pH range from 1 to 7 is preferred. The acidity of the reaction mixture may be derived from an ammonium salt but additional acid may be present, conveniently the acid corresponding to the ammonium salt employed.

Ammonium ions may be introduced as such or may be generated in situ. It is preferred to introduce ammonium ions in the form of an ammonium salt; suitable ammonium salts include the salts of aliphatic carboxylic acids, for example ammonium acetate, and the salts of mineral acids, for example ammonium sulphate and ammonium nitrate. Alternatively, gaseous ammonia or a solution of ammonia may be introduced into the reaction mixture. Hydrolysible amides, for example formamide or urea, may also be employed.

It is preferred to carry out the reaction in a solvent, or mixture of solvents, capable of bringing into solution both the ammonium salt (or other source of ammonium ions) and the organic reactants. In general, the reaction is conveniently carried out in a mixture of water and an organic solvent; suitable organic solvents in such mixtures include cyclic ethers, for example dioxan, and linear ethers, for example the dimethyl ether of diethylene glycol. In some instances an organic solvent alone, for example dimethyl formamide, has the required solvent properties.

The reaction is conveniently carried out at a temperature in the range from ambient temperature to the boiling point of the reaction mixture. In particular the reaction may be carried out under reflux at substantially atmospheric pressure but the reaction may be carried out over a wide range of temperature and pressure, depending upon the reactants and solvent employed.

It is preferred to use at least one mole of ammonium ion or ammonia per mole of glutaraldehyde, substituted glutaraldehyde or precursor thereof.

It is preferred to use from 0.01 to 5 moles (especially from 0.1 to 2.0 moles) of the quinone per mole of glutaraldehyde, substituted glutaraldehyde or precursor thereof.

The reaction may be carried out either batch-wise or as a continuous process. During the reaction the quinone is partly or wholly reduced to a product which may contain a hydroquinone and/or a semiquinone; the quinone may be regenerated from the reduction product either during the reaction or in a separate stage.

The process is applicable, in particular, to the manufacture of pyridine itself and of alkyl-substituted pyridines, for example methylpyridines. It will be apparent, however, that the process is applicable to the manufacture of a wide range of substituted pyridines.

The pyridine or substituted pyridines produced may be isolated by known techniques such as distillation, after making the products alkaline if necessary.

The invention is illustrated but not limited by the following examples.

EXAMPLE 1

61.5 grams (0.25 mole) of chloranil (tetrachloro-1,4-benzoquinone) were dissolved in 350 ml. dioxan and mixed with ammonium sulphate (33 grams, 0.25 mole) in 150 ml. aqueous sulphuric acid (containing 2% by volume of concentrated sulphuric acid). The mixture was refluxed and a solution of glutaraldehyde (25 grams, 0.25 mole) in water (100 ml.) was added over a period of two hours. The whole mixture was refluxed for a further two hours and the dioxan was then removed by distillation. The residue was filtered and the filtrate was distilled after being made alkaline with ammonia. The molar yield of pyridine from glutaraldehyde was 92%.

EXAMPLE 2

12.8 grams (0.1 mole) of 2-ethoxy-3,4-dihydro-2H-pyran were dissolved in dioxan (50 ml.) and added over a period of two hours to a boiling solution of chloranil (24.6 grams, 0.1 mole) and ammonium sulphate (13.2 grams, 0.1 mole) in a mixture of 100 ml. aqueous sulphuric acid (containing 5% by volume of concentrated sulphuric acid) and 400 ml. dioxan. The mixture was refluxed for a further two hours and the dioxan was removed by distillation. The residue was filtered, and the filtrate was distilled after being made alkaline with ammonia. The molar yield of pyridine from 2-ethoxy-3,4-dihydro-2H-pyran was 65%.

EXAMPLE 3

61.5 grams (0.25 mole) of chloranil and 24 grams (0.25 mole) of ammonium nitrate were dissolved in 400 ml. dimethylformamide. The mixture was refluxed and a solution of glutaraldehyde (25 grams, 0.25 mole) in dimethylformamide (50 ml.) was added over a period of two hours. The whole mixture was refluxed for a further two hours and then distilled. The molar yield of pyridine from glutaraldehyde was 63%.

EXAMPLE 4

A series of reactions was carried out under the conditions described in Example 1 except that in each reaction the chloranil was replaced by 0.25 mole of a different quinone. The molar yields of pyridine from glutaraldehyde were as follows:

| Quinone— | Molar yield (percent) |
|---|---|
| 1,4-naphthoquinone | 65 |
| 1,2-naphthoquinone | 14 |
| 9,10-phenanthroquinone | 25 |
| Tetrachloro-1,2-benzoquinone | 27 |
| 1,2-naphthoquinone-4-sulphonic acid (sodium salt) | 30 |
| Anthraquinone-1-sulphonic acid | 6 |

EXAMPLE 5

24.6 grams of chloranil and 6.0 grams of urea were dissolved in a mixture of dioxan (350 ml.), water (100 ml.) and concentrated sulphuric acid (6 ml.). The solution was boiled under reflux and a solution of glutaraldehyde (10 grams) in 40 ml. water was added dropwise over a period of 2 hours. The resulting mixture was refluxed for a further hour and the dioxan was removed by distillation. The residue was filtered and the filtrate was distilled after being made alkaline with ammonia. The molar yield of pyridine from glutaraldehyde was 72%.

EXAMPLE 6

A reaction was carried out as described in Example 5 except that the urea was replaced by formamide (4.5 grams). The molar yield of pyridine from glutaraldehyde was 75%.

What I claim is:

1. In a process for the manufacture of pyridine or substituted pyridines wherein a member selected from the group consisting of glutaraldehyde, methyl-substituted glutaraldehyde and 2-alkoxy-3,4-dihydro-2H-pyrans having up to 6 carbon atoms in the alkoxy group is reacted in the liquid phase with ammonium ions or ammonia, the improvement wherein said reaction is carried out in the presence of a quinone selected from the group consisting of tetrachchlorobenzoquinones, naphthoquinones, phenanthroquinones, the sodium salt of 1,2-naphthoquinone-4-sulphonic acid, and anthraquinone-1-sulphonic acid.

2. A process as claimed in claim 1 wherein the quinone is 2,3,5,6-tetrachloro-1,4-benzoquinone.

3. A process as claimed in claim 1 wherein the quinone is 1,4-naphthoquinone.

4. A process as claimed in claim 1 wherein ammonium ions are introduced in the form of an ammonium salt selected from the group consisting of ammonium salts of aliphatic carboxylic acids, ammonium sulphate, and ammonium nitrate.

5. A process as claimed in claim 1 wherein the reaction is carried out at a pH in the range from 1 to 7.

6. A process as claimed in claim 1 wherein there is employed at least one mole of ammonium ions or ammonia per mole of said glutaraldehyde, substituted glutaraldehyde and 2-alkoxy-3,4-dihydro-2H-pyran.

7. A process as claimed in claim 1 wherein from 0.01 to 5 moles of the quinone are employed per mole of said glutaraldehyde, substituted glutaraldehyde and 2-alkoxy-3,4-dihydro-2H-pyran.

8. A process as claimed in claim 7 wherein from 0.1 to 2 moles of the quinone are employed per mole of said glutaraldehyde, substituted glutaraldehyde and 2-alkoxy-3,4-dihydro-2H-pyran.

References Cited

Morrison et al.: Org. Chem. (Allyn & Bacon, Boston, 1959), pp. 845–7.

HENRY R. JILES, Primary Examiner

U.S. Cl. X.R.

260—601